May 12, 1925.
G. A. LUTZ
WELDING TUBES
Filed July 26, 1922     2 Sheets-Sheet 2
1,537,177
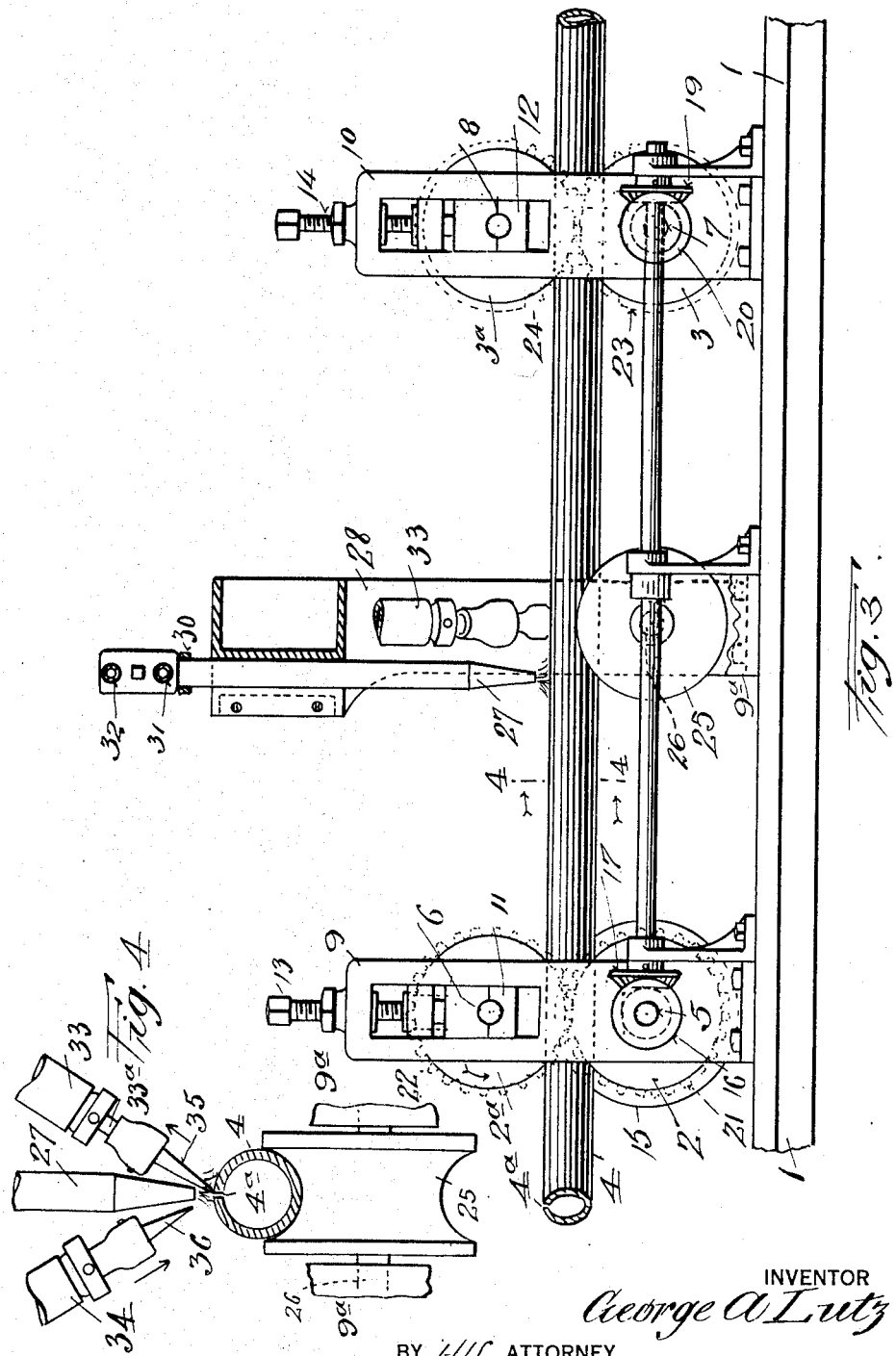
INVENTOR
George A Lutz
BY   ATTORNEY Patented May 12, 1925.

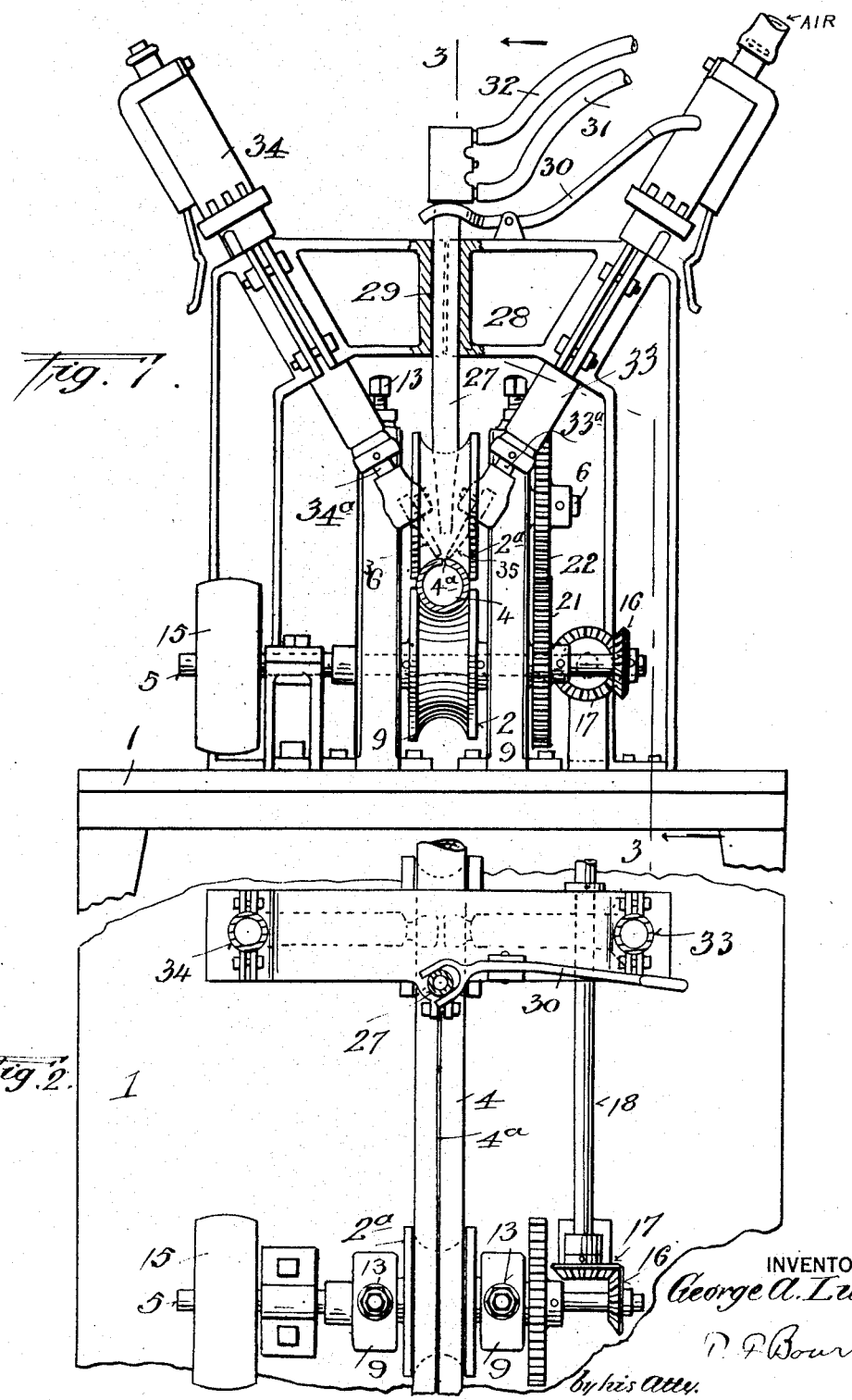

1,537,177

UNITED STATES PATENT OFFICE.

GEORGE A. LUTZ, OF CRANFORD, NEW JERSEY, ASSIGNOR TO AMERICAN CIRCULAR LOOM COMPANY, OF PITTSBURGH, PENNSYLVANIA, A CORPORATION OF PENNSYLVANIA.

WELDING TUBES.

Application filed July 26, 1922. Serial No. 577,517.

*To all whom it may concern:*

Be it known that I, GEORGE A. LUTZ, a citizen of the United States, and resident of Cranford, in the county of Union and State of New Jersey, have invented certain new and useful Improvements in Welding Tubes, of which the following is a specification.

The meeting edges of metallic articles, such as metal tubes, have been welded together by means of heat applied to such edges either by the electric current or by gas flame, the edges of such articles where heated being retained close together so that the metal at the edges will fuse together to effect the welding. In such processes the joining of the meeting edges of the metal depends, to some extent, upon the straightness of the edges and the contact between opposing edges due to the pressure of rolls or dies through which the article passes, and it frequently occurs that parts of the edges are not thoroughly welded together.

The object of my invention is to effectively weld the edges of the material together while such material is progressing through the machine by not only heating such edges to a welding degree, but by hammering the heated edges in such a way as to cause opposing heated edges to be brought into contact and to cause the heated metal to flow together to unite the edges at all points with a hammered weld.

In carrying out my invention I advance a preformed metal article, such as a tube having an open seam, apply heat to the advancing seam edges to a required welding or fusing degree, and I hammer such heated edges toward and against each other to cause the metal of the opposing edges at the welding point to be brought into intimate contact so that the fused metal of such edges will flow intimately together to produce an effective welding due to the hammering of the metal adjacent to such edges.

My invention also comprises novel details of improvement that will be more fully hereinafter set forth and then pointed out in the claims.

Reference is to be had to the accompanying drawings forming part hereof, wherein—

Fig. 1 is an end view of a machine embodying my invention, part being in section;

Fig. 2 is a partly sectional detail plan view;

Fig. 3 is a side view, partly in section on line 3, 3 in Fig. 1, and

Fig. 4 is a detail section on line 4, 4 in Fig. 3.

Similar numerals of reference indicate corresponding parts in the several views.

The main frame 1 of the machine may be of any suitable construction and is shown provided with spaced pairs of feed rolls 2, 2ª and 3, 3ª. In the example illustrated said feed rolls are peripherally grooved to provide passes therebetween to feed the articles to be welded, such as a preformed tube 4 having an open seam 4ª longitudinally disposed. Said feed rolls are shown carried respectively by shafts 5, 6, 7, 8 supported by uprights 9, 10 on the main frame, the shafts 6 and 8 being shown carried in boxes 11, 12 guided in said uprights and controlled by screws 13, 14 to provide the desired distance between the corresponding feed rolls and create the desired pressure upon tube 4 between said rolls for feeding the latter. Said feed rolls may be operated in any desired manner, as by means of a motor 15 mounted upon or connected to drive one of the shafts, such as shaft 5. I have shown shaft 5 provided with a gear 16 in mesh with a gear 17 on shaft 18 journaled on the main frame and having a gear 19 in mesh with a gear 20 on shaft 7. Shaft 5 is shown provided with a gear 21 in mesh with a gear 22 on shaft 6, and shaft 7 is shown provided with a gear 23 in mesh with a gear 24 on shaft 8. The arrangement is such that the pairs of feed rolls 2, 2ª and 3, 3ª will be driven at corresponding speeds and directions to propel the tube 4. Such pairs of feed rolls are suitably spaced apart and between them is located a guide roller or die 25 for tube 4 upon which said tube rests, the roller 25 being carried upon a shaft 26 supported upon the main frame in suitable bearings, as at 9ª. Any suitable means may be provided for heating the tube 4 along its seam as the tube is advanced by the feed rolls. I have illustrated a burner or torch 27 having its nozzle located in a suitable position opposing the seam of tube 4, which burner or torch may be supported by the main frame in any suitable manner, such as by means of the supporting standard or frame 28 extending from main frame 1 between the feed rolls. The burner or torch 27 may be adjustably supported upon standard or support 28, as by being fitted in a bearing 29 and adapted to be raised and lowered by a lever 30. The burner or torch 27 may be of the variety adapted for oxy-acetylene welding having feed pipes 31, 32, in a well known manner. Instead of using a gas flame for heating the tube 4 at the seam, the same may be heated by any desired well known electric heating devices for fusing the metal of the tube along the seam.

At a point adjacent to the heating means, such as the burner or torch 27, I locate means for hammering the metal at the adjacent edges of seam 4ª of tube 4 to force the heated or fused edges of the tube into contact. At 33, 34 are indicated suitable engines or motors provided with hammers or plungers 35, 36 carried by reciprocative pistons 33ª, 34ª of said engines or motors. The engines or motors 33, 34 may be of any well known construction, such as air engines or motors as are used in operating rock drills, sand rammers or the like whereby the pistons and the hammers 35, 36 will be rapidly reciprocated to hammer the metal of tube 4 at its seam. The engines and hammers are shown located in such position as to converge or approach where the hammers contact tube 4, so as to cause the heated metal of such tube on opposite sides of its seam to be forced together. While I have illustrated, in Fig. 1, the engines 33, 34 as located at an acute angle respecting each other on opposite sides of a vertical plane through the seam of tube 4, which is shown upwardly disposed, said hammers and engines may be located in any other desired relation to the tube seam so as to force the metal of the tube on opposite sides of the seam together by the hammer blows. The engines are shown secured upon standard or frame 28. The hammers or plungers 35, 36 may have any desired shape adapted to engage the metal on opposite sides of and adjacent to the seam 4ª of tube 4 to cause the heated or fused metal to flow together under the impact of the blows.

In accordance with my invention the preformed tube will be fed at suitable speed by the feed rolls and the heating means will be applied suitably along the metal of the seam 4ª of the traveling tube to heat the same to a welding degree, and as the heated portion of the tube passes from the heating means, as to the right in Fig. 3, the hammers or plungers 35, 36 will be reciprocated with sufficient rapidity to apply continuous blows to opposite sides of the metal of the tube adjacent to its seam, whereby such metal will be forced or displaced into contact while hot thereby producing an improved welded seam in the class of articles referred to, as distinguished from such welded seams usually made by holding the edges of the metal at the seam in contact without hammering or displacing such metal.

It will be noted that the operation of feeding, heating and hammering the tube for welding the edges of its seam together is carried out in a continuous manner during the feeding of the tube, it being understood that the hammer blows against the tube are sufficiently rapid, in accordance with the speed of feeding of the tube, to hammer the heated portion of the tube at substantially all points along the seam, and yet the blows should be sufficiently light as not to distort the metal while causing its displacement in a direction substantially transverse to the plane of the seam. The hammered welded edges of the tube seam will be more perfect and less liable to separate than the other welded tube seams I have referred to.

While I have illustrated means capable of carrying out my invention, it will be understood that my invention is not limited to the details of construction set forth, as the same may be varied, within the scope of the appended claims, without departing from the spirit of my invention.

Having now described my invention, what I claim is:—

1. The method of welding the meeting edges of metallic articles having seams consisting in moving said article, heating the part thereof to be welded while the article moves, and hammering the heated portion of the metal on the outside on opposite sides of the seam while the article advances.

2. The method of welding the meeting edges of metallic articles consisting in feeding the article continuously, heating the portion of the article to be welded while it moves, and hammering the metal simultaneously on opposite exterior sides thereof where heated and causing the heated metal to contact and weld together.

3. The method of welding the meeting edges of the seam of a metallic tube consisting in feeding said tube longitudinally, heating the metal at the edges of the seam to a welding heat, and hammering said heated edges on the outside on opposite sides of the seam during feeding of the tube causing said edges to contact throughout the length of the tube to weld said edges together.

4. The method of welding the meeting edges of a preformed metallic tube having a longitudinal seam consisting in feeding said tube continuously, heating the edges of the tube while it moves, and hammering the metal of the tube on opposite exterior sides of its seam in directions to cause the metal at the edges of the seam to contact and weld together.

5. The method of welding the meeting edges of a preformed metallic tube having a longitudinal seam consisting in feeding said tube continuously, heating the edges of the tube while it moves, and hammering the metal at opposite sides of the seam in directions converging toward a vertical plane through the seam on opposite sides thereof causing the metal to contact and weld together as the tube progresses.

6. A machine for welding the meeting edges of metallic articles comprising means to feed the article, means to heat the article while being fed, and means to simultaneously hammer the exterior heated portion of the article on opposite sides of said edges.

7. A machine for welding the meeting edges of metallic articles comprising means to feed the article, means to heat the article while being fed, hammers opposed to the exterior of said article at the heated portion thereof, and means to reciprocate said hammers to hammer the heated metal together.

8. A machine for welding the meeting edges of metallic articles comprising means to feed the article, means to heat the article while being fed, hammers located at an angle to each other on opposite exterior sides of the heated portion of the article, and engines on opposite sides of the plane of said article to actuate said hammers.

9. A machine for welding the meeting edges of a preformed metallic tube having an open seam comprising means to feed the tube, means to heat the tube along its seam, and means to hammer the exterior of the tube adjacent to its seam in directions converging toward the plane of the seams to cause the heated edges of the seam to contact.

10. A machine for welding the meeting edges of a preformed metallic tube having an open seam comprising means to feed the tube, means to heat the tube along its seam, hammers located at an angle to the seam of the tube on the exterior thereof to engage the exterior of the metal at the edges thereof, and means to rapidly reciprocate said hammers.

11. A machine for welding the meeting edges of a preformed metallic tube having an open seam comprising means to feed the tube, means to heat the tube along its seam, hammers located on opposite sides of the plane of the seam of the tube and at an angle to each other, and engines to actuate said hammers to cause the heated metal of the tube at the seam to contact.

GEORGE A. LUTZ.